United States Patent [19]
Orta

[11] Patent Number: 5,206,538
[45] Date of Patent: Apr. 27, 1993

[54] AUTOMATIC SYSTEM BATTERY RECONNECT CIRCUIT RESPONSIVE TO INSERTION OF NEW BATTERY REPLACEMENT

[75] Inventor: Conrad Orta, Denville, N.J.

[73] Assignee: AT&T Bell Laboratories, Murray Hill, N.J.

[21] Appl. No.: 680,177

[22] Filed: Apr. 3, 1991

[51] Int. Cl.⁵ .............................................. H02J 9/04
[52] U.S. Cl. ...................................................... 307/66
[58] Field of Search ............................ 361/66, 87, 64

[56] References Cited

U.S. PATENT DOCUMENTS 5,028,806  7/1991  Stewart et al. .................... 307/66
5,130,562  7/1992  Freymuth ........................... 307/66

FOREIGN PATENT DOCUMENTS 2010028 10/1978 United Kingdom.

*Primary Examiner*—A. D. Pellinen
*Assistant Examiner*—Aditya Krishnan
*Attorney, Agent, or Firm*—Alfred G. Steinmetz

[57] ABSTRACT

A battery reconnect scheme is provided to permit battery replacement in a power reserve system without requiring the manual switching of the battery terminals into and out of the circuitry. A battery reconnect circuit is provided to perform the functions normally performed manually during the replacement of a discharged battery with a fresh battery. These functions also include checking the operability of circuitry to be powered by the newly inserted battery.

8 Claims, 2 Drawing Sheets

AUTOMATIC SYSTEM BATTERY RECONNECT CIRCUIT RESPONSIVE TO INSERTION OF NEW BATTERY REPLACEMENT

FIELD OF THE INVENTION

This invention relates to power circuits having battery reserve circuits and, in particular, to the replacement of batteries and the testing of circuitry powered by the battery reserve circuit.

BACKGROUND OF THE INVENTION

Modern electronic systems frequently use battery backup systems as a safety feature to prevent loss of service due to a failure of a primary power source. To provide effective protection requires the use of fully charged batteries capable of supplying the needed backup power for some acceptable time interval. In some instances, however, the power loss duration may exceed the time limit capability of the reserve battery power and it may be desirable to replace the discharged battery to provide further service or test system operability. This additional requirement requires that the battery backup system have the capability of charging batteries and the ability to activate the system at least momentarily for test purposes with a replacement battery even in the continued absence of primary power. Such testing requirements may occur in communication systems where it is necessary to determine the operativeness of the communication system during the loss of primary power for extended intervals exceeding battery reserve power capabilities.

Most systems having battery reserve power include circuitry to disconnect the battery at some point during an extended loss of primary power to protect the battery from permanent damage, such as cell reversal, after it has discharged to some threshold voltage level. Replacing a discharged battery with a fresh battery in such a system arrangement, and testing the operativeness of the system before restoration of primary power normally requires the switching of the battery terminals into the active circuitry for a short interval of time. This testing is often performed before the restoration of primary power to the system. Frequently this is performed with a manual switching arrangement. Such an arrangement not only requires an operator's understanding of circuit processes, but it also requires readily accessible manual switches and associated circuitry. If properly ergonomically designed, such manual switch arrangements may be spatially inefficient with respect to the spatial requirements of the circuit itself. Provision of the needed manual switching capability may indeed seriously compromise spatially efficient packaging of the circuitry itself.

SUMMARY OF THE INVENTION

Therefore a battery reconnect scheme, in accordance with the principles of the invention, is provided to permit battery replacement in a power reserve system without requiring the manual switching of the battery terminals into and out of the circuitry. A battery reconnect circuit is provided to perform the functions normally performed manually during the replacement of a discharged battery with a fresh battery. These functions also include checking the operability of circuitry to be powered by the newly inserted battery.

The battery reconnect circuit is operative to connect a newly inserted battery voltage source to a load after the previous battery was disconnected from the load in response to a low voltage condition. As soon as a battery is disconnected from the circuit, the reconnect circuit is reset. Upon connection of a new fully charged battery to the circuit, the battery is automatically connected to the system for at least a short time period to test its operability.

DETAILED DESCRIPTION

Figure 1:
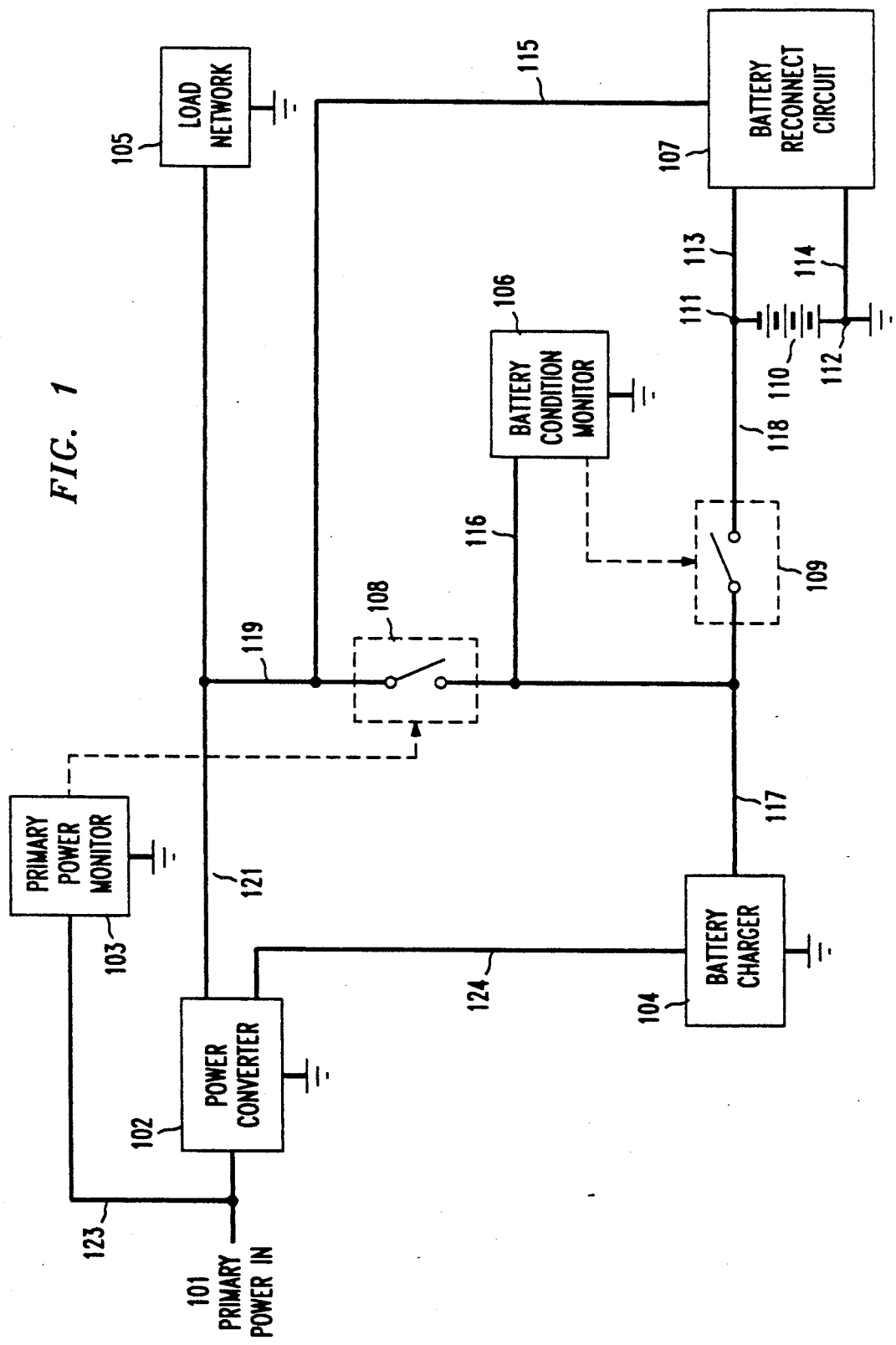
FIG. 1 is a block diagram of a system for applying power to a load including battery reserve power.

An arrangement for applying power to a load network protected by backup battery reserve power is shown in FIG. 1. DC voltage/power is applied to a DC/DC power converter 102 which changes the input DC voltage level on input lead 101 to another DC voltage level on output lead 121. The converter output on lead 121 is applied to a load network 105. Load network 105 may be part of a communication system requiring reserve power. It is expected that this system may be subject to extended outages extending beyond the capability of the battery reserve power provided to it. Hence, it may be necessary to replace a discharged battery with a fresh battery and to test the operativeness of the system represented by the load network 105 before primary power is restored.

A second output lead 124 of the power converter 102 is connected to energize a battery charger 104. Battery charger 104 is connected to apply a charging current, via lead 117 and switch 109 and lead 118, to a battery 110 to keep it in a fully charged condition as long as primary power is available. Switch 109 is under the control of the battery condition monitor 106 which monitors the battery terminal voltage, via lead 116. Switch 109 normally remains closed as long as the voltage of battery 110 is at or above an acceptable voltage level as set by the battery condition monitor. The lead 116 is connected to the switch 109 at a terminal separated from the battery by switch 109 so that the circuitry of battery condition monitor 106 does not further drain the battery when switch 109 is open.

Lead 119 and switch 108 connect the battery 110 to the load network 105. Switch 108 is controlled by the primary power monitor 103, which is connected to the input lead 101 via lead 123. As long as the primary input voltage/power is satisfactory the switch 108 is in an open position in which the battery is not connected to the load network 105. If a primary power failure is detected, the battery power monitor 103 closes the switch 108 to connect the battery 110 to the load 105.

If the loss of primary voltage/power is for an extended interval of time, the battery may discharge to a voltage level at which the battery itself may suffer permanent damage, such as cell reversal. At this time the battery is disconnected from the load by the opening of switch 109, in response to the battery condition monitor 106.

Once the discharged battery 110 is removed, the replacement battery is reconnected to the load even if the primary power is not restored for the purpose of demonstrating the operativeness of the load network 105.

Reconnection of the newly installed battery to the load is accomplished via the action of the battery reconnect circuit 107. The battery reconnect circuit 107 is connected to the battery terminals 111 and 112, via the leads 113 and 114, respectively. The battery reconnect circuit 107 is connected to the load network 105, via leads 115 and 119. In operation the battery reconnect circuit 107 connects the battery 110 to the load network 105 for an interval sufficiently long to test system operativeness. It then subsequently disconnects the battery from the load network 105. During normal operation when power is supplied by the primary power source the battery reconnect circuit 107 is in an inactive state.

Figure 2:
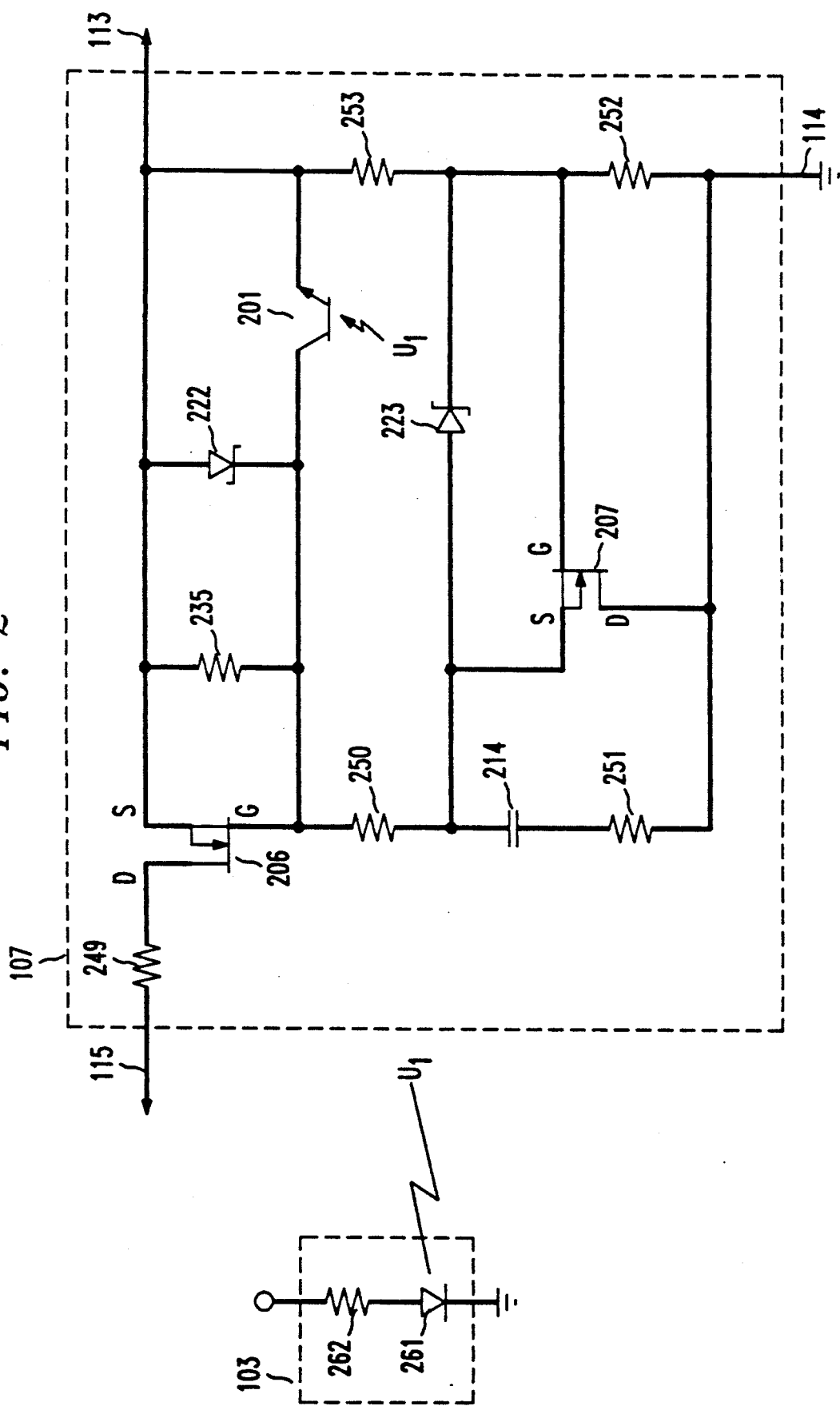
FIG. 2 is a schematic of a battery reconnect circuit included in the system for applying power shown in FIG. 1.

The battery reconnect circuit is shown in detail in FIG. 2. Leads 113 and 114 are connected to opposite terminals 111 and 112 of the battery 110 and lead 115 is connected to the load network 105. A portion of the primary power monitor 103 includes a light emitting diode 261 connected to the primary power on input lead 101 through resistor 263. When primary power is present the light emissions of the diode 261 enables the photo transistor 201 into its conducting state. With the transistor 201 conducting, the gate source junction of the FET switch 206, coupling the reconnect circuit to the lead 115, via resistor 249, is shorted and FET switch 206 is disabled and non-conducting. Hence connection, via resistor 249, lead 115 and lead 119 to the load network 105 is fully disabled.

Assuming a failure of primary power of sufficient interval to cause the battery 110 to be fully discharged the battery 110 is disconnected from the load network by the battery monitor 106 opening the switch 109. Ordinarily replacement of the discharged battery with a fresh fully charged battery does not at this juncture energize the load network 105. The reconnect circuit 107, however, reconnects the battery to the load network of a short time interval even in instances where the primary power has not yet been restored.

With no primary power present and with the battery pack removed, the capacitor 214 in the reconnect circuit 107 is in a discharged condition. When a new fully charged battery is installed, between terminals 111 and 112, a voltage is applied across the resistor 250 and the gate-source junction of FET 206. (A break-down diode 222 protects the gate-source junction from damage due to an overvoltage.) The FET 206 is biased into its conductive region and remains there until the gate-source voltage drops below the sustaining threshold. The duration of this enabling gate-source voltage is controlled by a time constant of the RC circuit including the resistors 235, 250, 251 and 253 and the capacitor 214. The initial inrush current when FET 206 is initially enabled is limited by the resistor 249. With the FET 206 conducting, the battery 110 is connected, via lead 113, FET 206 and leads 115 and 119 to the load network 105.

With the FET 206 conducting, the capacitor 214 is being charged and its accumulating voltage eventually turns off the FET 206 when its voltage is sufficient to backbiase the gate-source junction. The RC circuit time constant is selected so that the functionality of the load network 105 may be accurately determined and switch 109 reclosed before the FET is disabled to its non-conducting state. In some applications it may be desirable to set this time interval to a sufficient length to allow initialization of the load network's communication system.

As described above, after a prolonged primary power failure, the battery 110 has discharged and switch 109 has been opened to fully disconnect the battery 110 and protect it from a cell reversal. As long as this battery is connected to terminals 111 and 112, its current drain must be reduced to a minimum to prevent battery damage. The values of resistors 252 and 253 are selected to have high resistance values to minimize current loading on the battery and hence prevent any significant current drain on the battery.

Upon removal of a discharged battery the voltage across the capacitor 214 appears across the source-gate junction of the FET 207 thereby biasing it into conduction. This conducting FET 207 discharges the capacitor 214 rapidly. The reconnect circuit is now in a condition to operate immediately once the battery is reinserted between terminals 111 and 112. This controlled rapid discharge of capacitor 214 obviates the need of the operator replacing the battery from having to consider if a sufficient time interval has passed to make the reconnect circuit operative before inserting a new battery.

I claim:

1. A power system for energizing a load network, comprising:

power circuitry for connecting a source of primary power to the load network;

backup circuitry including a reserve input for accepting a reserve voltage source and coupling it to the load network upon failure of the primary power source; and including disconnect circuitry for disconnecting the reserve voltage source from the load network when it becomes discharged below a threshold voltage;

circuitry for enabling connection of the reserve input to the load network in response to replacement of the reserve voltage source with a substitute reserve voltage source, and including;

a first semiconductor switch for enabling coupling of the reserve input to the load network, a second semiconductor switch responsive to the operativeness of the primary power source for disabling the first semiconductor switch and responsive to the failure of primary power to allow a voltage of the reserve input to bias the first semiconductor switch into conduction, and timing circuitry operative for disabling the first semiconductor switch after an interval of conduction connecting the reserve input to the load network.

2. A power system for energizing a load network, as claimed in claim 1, comprising:

the timing circuitry including a capacitor connected to be charged through a resistor, a third semiconductor switch connected to discharge the capacitor in response to accumulated voltage of the capacitor, and removal of the reserve voltage source from the reserve input, and a breakdown diode connected to PROTECT the third semiconductor switch from an overvoltage.

3. A power system for energizing a load network, as claimed in claim 1, comprising:

the circuit for enabling connection having a very high input impedance to limit current drain of the reserve voltage source connected to the reserve input.

4. A power system for energizing a load network, comprising:

a DC/DC power converter energized by a primary voltage source, and connected to supply energy to the load network;

a reserve input for accepting a reserve battery voltage source;

a battery charger connected to be energized by the DC/DC power converter and connected to supply charging current to the reserve input;

a primary power monitor for monitoring the voltage of the primary voltage source;

a battery condition monitor to monitor the voltage of the battery voltage source connected to the reserve input;

a first power switch for connecting the reserve input to the load network in response to the primary power monitor detecting a falling of the voltage level of the primary voltage source below a first threshold value;

a second power switch for disconnecting the reserve input from the load network in response to the voltage of the battery voltage source falling below a second threshold value;

a battery reconnect circuit for connecting the reserve input to the load network in response to replacing the battery voltage source with a replacement battery voltage source, including:

an FET switch coupling the reserve input to the load network;

bias circuitry for enabling conduction in the FET switch in response to the replacing of the battery voltage source with a replacement battery voltage source having;

a transistor switch responsive to the primary power monitor operative for enabling the FET switch by allowing a bias voltage supplied by the replacement battery voltage source to appear across a gate-source junction of the FET switch;

a timing circuit including a timing capacitor and connected to charge in response to the replacement battery voltage source and bias the FET switch non-conducting after a time interval, and a second FET switch for discharging the timing capacitor when a battery voltage source is removed from the reserve input.

5. A power system for energizing a load network, as claimed in claim 4, comprising:

a light emitting diode in the primary power monitor; and the transistor switch being a photo transistor responsive to the light emitting diode.

6. A power system for energizing a load network, as claimed in claim 4, comprising:

the battery reconnect circuit including a high impedance input including high valued resistors connected to a lead connected to the reserve input.

7. A power system for energizing a load network, comprising:

a DC/DC power converter for connecting a source of primary power to the load network;

backup circuitry including a reserve input for accepting a reserve voltage source and coupling it to the load network upon failure of the primary power source; and including disconnect circuitry for disconnecting the reserve voltage source from the load network when it becomes discharged below a threshold voltage;

circuitry for enabling connection of the reserve input to the load network in response to replacement of the reserve voltage source with a substitute reserve voltage source, and including;

a high input impedance connected to limit a current drain of the reserve voltage source connected to the reserve input, a first FET switch for enabling coupling of the reserve input to the load network, a second FET switch responsive to the operativeness of the primary power source for disabling the first FET switch and responsive to the failure of primary power to allow a voltage of the reserve input to bias the first FET switch into conduction, and timing circuitry operative for disabling the first FET switch after an interval of conduction connecting the reserve input to the load network, including;

a capacitor connected to be charged by the reserve voltage source through at least a resistor, a third FET switch connected to discharge the capacitor and responsive to removal of the reserve voltage source from the reserve input, and a breakdown diode connected to protect the third FET switch from an overvoltage.

8. A power system for energizing a load network, comprising:

a DC/DC power converter energized by a primary voltage source, and connected to supply energy to the load network;

a reserve input for accepting a reserve battery voltage source;

a battery charger connected to be energized by the DC/DC power converter and connected to supply charging current to the reserve input;

a primary power monitor for monitoring the voltage of the primary voltage source and including at least a light emitting diode connected to be responsive to current flow from the primary voltage source;

a battery condition monitor to monitor the voltage of the battery voltage source connected to the reserve input;

A first power switch for connecting the reserve input to the load network in response to the primary power monitor detecting a falling of the voltage level of the primary voltage source below a first threshold value;

a second power switch for disconnecting the reserve input from the load network in response to the voltage of the battery voltage source falling below a second threshold value;

a battery reconnect circuit for connecting the reserve input to the load network in response to replacing the battery voltage source with a replacement battery voltage source, including:

a first FET switch coupling the reserve input to the load network, bias circuitry for enabling conduction in the first FET switch in response to the replacing of the battery voltage source with a replacement battery voltage source, having;

a photo-transistor switch responsive to the absence of light emissions of the light emitting diode of primary power monitor operative for enabling the FET switch by allowing a bias voltage supplied by the replacement battery voltage source to appear across a gate-source junction of the FET switch;

a timing circuit including a timing capacitor and a resistive impedance and connected to charge in response to the replacement battery voltage source and bias the FET switch non-conducting after a time interval, and a second FET switch for discharging the timing capacitor when a battery voltage source is removed from the reserve input;

a breakdown diode connected to protect the second FET switch from an overvoltage and having its low resistance current path oriented to allow current from the reserve voltage source to charge the timing capacitor;

the resistive impedance connected to provide a high impedance to the reserve input and operative for limiting current drain of the reserve voltage source connected to the reserve input when the reserve input is disconnected from the load network.

* * * * *